US012774893B2

(12) United States Patent
Patel et al.

(10) Patent No.: US 12,774,893 B2
(45) Date of Patent: *Oct. 27, 2026

(54) NAVIGATION AS A FUNCTION OF A SAFETY METRIC

(71) Applicant: AT&T Intellectual Property I, L.P., Atlanta, GA (US)

(72) Inventors: Bhumit Patel, Woodstock, GA (US); Wasib Khallil, Lawrenceville, GA (US); Iftekhar Alam, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/182,736

(22) Filed: Apr. 18, 2025

(65) Prior Publication Data

US 2025/0277667 A1 Sep. 4, 2025

Related U.S. Application Data

(63) Continuation of application No. 17/718,865, filed on Apr. 12, 2022, now Pat. No. 12,298,143.

(51) Int. Cl.
*G01C 21/34* (2006.01)

(52) U.S. Cl.
CPC ..... *G01C 21/3461* (2013.01); *G01C 21/3476* (2013.01); *G01C 21/3484* (2013.01)

(58) Field of Classification Search
None
See application file for complete search history.

(56) References Cited

U.S. PATENT DOCUMENTS

| | | | | |
|---|---|---|---|---|
| 6,175,803 | B1 | 1/2001 | Chowanic et al. | |
| 10,794,715 | B1 | 10/2020 | Truong et al. | |
| 12,298,143 | B2 * | 5/2025 | Patel | G01C 21/3476 |
| 2002/0133292 | A1 | 9/2002 | Miyaki | |
| 2010/0100319 | A1 * | 4/2010 | Trinko | G01C 21/367 707/E17.014 |
| 2011/0112858 | A1 | 5/2011 | Neal | |
| 2011/0169647 | A1 * | 7/2011 | Morley | G01C 21/3697 701/408 |
| 2011/0261067 | A1 | 10/2011 | Trinko et al. | |
| 2012/0143491 | A1 | 6/2012 | Cheng | |
| 2013/0007011 | A1 | 1/2013 | Setlur et al. | |
| 2019/0174287 | A1 | 6/2019 | Yadav | |
| 2023/0319811 | A1 | 10/2023 | Jain et al. | |

* cited by examiner

*Primary Examiner* — Navid Z. Mehdizadeh
*Assistant Examiner* — Jason R Roberson
(74) *Attorney, Agent, or Firm* — Guntin & Gust, PLC; Colin LaRose

(57) ABSTRACT

Architectures and techniques are presented that can leverage safety metrics such as crime or health-based statistics at various geographic locations to supplement or improve navigation application searches or results. For example, navigation search results can be tagged with safety metric alert indicia if a location associated with a search result (or a location associated with a path to the point of interest of the search result) does not satisfy a defined safety metric. As another example, navigation search results can be generated as a function of the defined safety metric rather than merely as a function of distance, thereby operating to filter results that do not satisfy the safety metric, whether filtering a particular point of interest or filtering a path to a selected point of interest.

20 Claims, 11 Drawing Sheets

NAVIGATION AS A FUNCTION OF A SAFETY METRIC

CROSS REFERENCE TO RELATED APPLICATIONS

This application is a continuation of U.S. patent application Ser. No. 17/718,865 filed on Apr. 12, 2022. All sections of the aforementioned application are incorporated herein by reference in their entirety.

TECHNICAL FIELD

The present application relates generally to navigation as a function of a safety metric and more particularly to introducing a safety metric to navigation systems to, for example, provide safety-based navigation.

BACKGROUND

Today, navigation applications or other navigation systems are relied upon by many users worldwide to navigate from point A to point B. These navigation applications are becoming increasingly more accurate and can rapidly perform updates based on traffic patterns, traffic congestion, road construction, emergency services actions and so forth. Moreover, most navigation applications can route paths based on user preferences such as avoiding toll roads, shortest distance, shortest time, and so on.

BRIEF DESCRIPTION OF THE DRAWINGS

Numerous aspects, embodiments, objects and advantages of the present application will be apparent upon consideration of the following detailed description, taken in conjunction with the accompanying drawings, in which like reference characters refer to like parts throughout, and in which.

DETAILED DESCRIPTION

Overview

Figure 1:
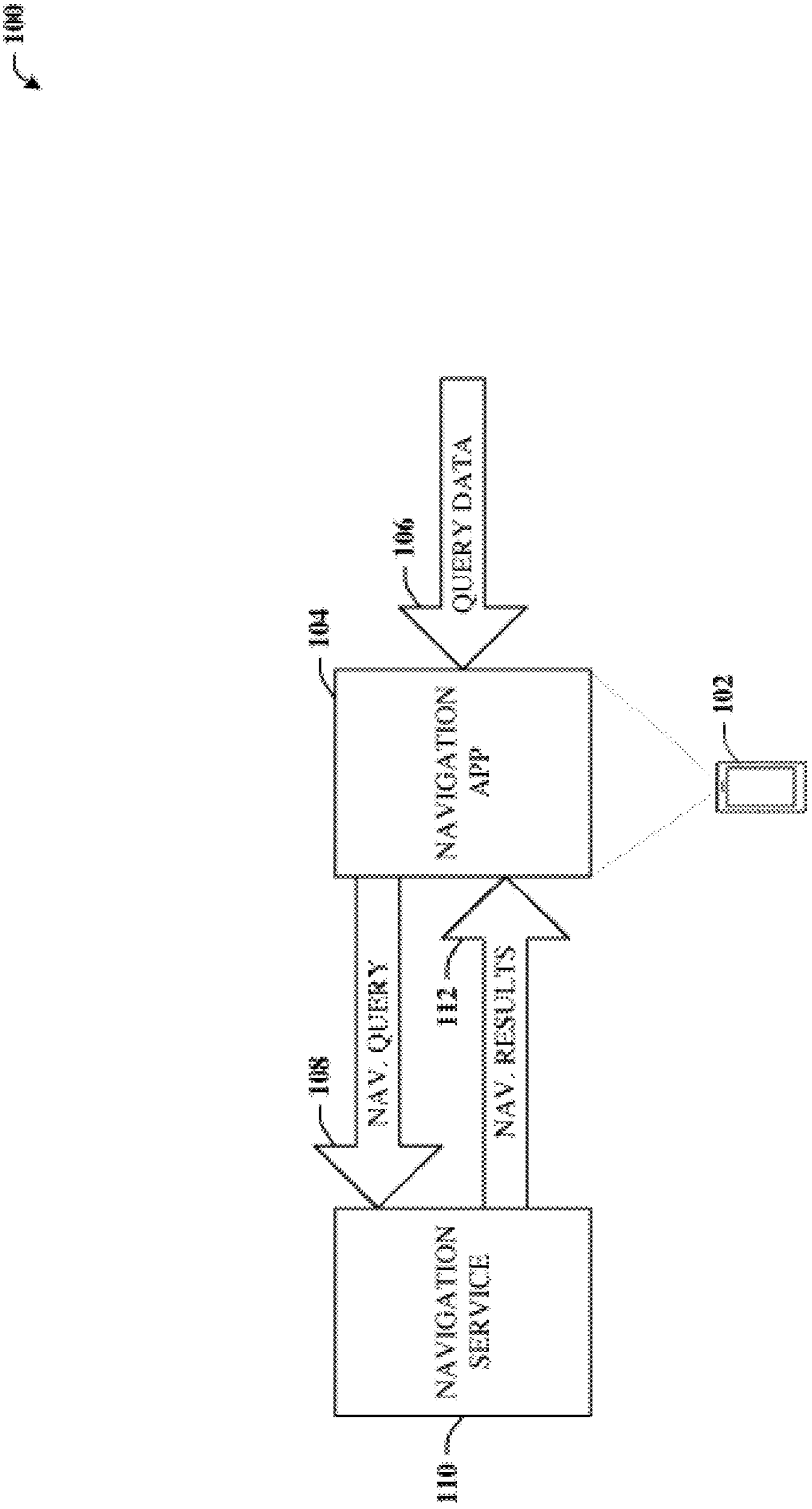
FIG. 1 illustrates a schematic block diagram of an example navigation system in accordance with certain embodiments of this disclosure.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

In order to better describe the disclosed subject matter, it can be instructive to consider certain existing techniques used by conventional navigation systems, an example of which can be found at FIG. 1.

With reference now to FIG. 1, a schematic block diagram 100 of an example navigation system is presented in accordance with certain embodiments of this disclosure. For example, consider a user equipment (UE) device 102 such as a mobile phone or other device that executes navigation application (app) 104, which can aid a user in navigating from a current location to a selected point of interest (POI).

Typically, a user will input query data 106 such a query for a gas station, restaurant, or other POI. From this query data 106, a navigation query 108 can be generated and sent to navigation service 110. Communication between UE 102 (and/or navigation app 104) can be facilitated via an associated application programming interface (API) (not shown). In response navigation service 110 can provide navigation results 112, which may relate to results of the query (e.g., a group of query results that satisfy navigation query 108) or may relate to a specific POI that was selected, potentially from a previously provided group of query results.

As noted, navigation results 112 can take into account numerous navigation data points such as traffic congestions, road closures or construction and so forth. However, navigation results 112 are generally determined essentially based on the current location of UE 102 and therefore, essentially entirely as a function of travel distance or travel time.

It is observed that in recent years, crime rates have broadly increased, in some cases significantly so. Violent crimes such as robbery and so-called 'carjacking' or the like are on the rise. In addition to crime metrics, society is also worried about viruses or other pathogens and/or health metrics. For example, many people will choose to drive farther in order to avoid an area where there is a known outbreak of corona virus or another pathogen.

As a result, many people are becoming increasingly concerned when traveling, particularly when traveling to a new or unfamiliar area or with children in the vehicle. As noted, navigations systems currently have some capability to identify police actions, construction, road work, accidents and the like. While such represents a useful improvement, other potential improvements have gone unnoticed.

Figure 2:
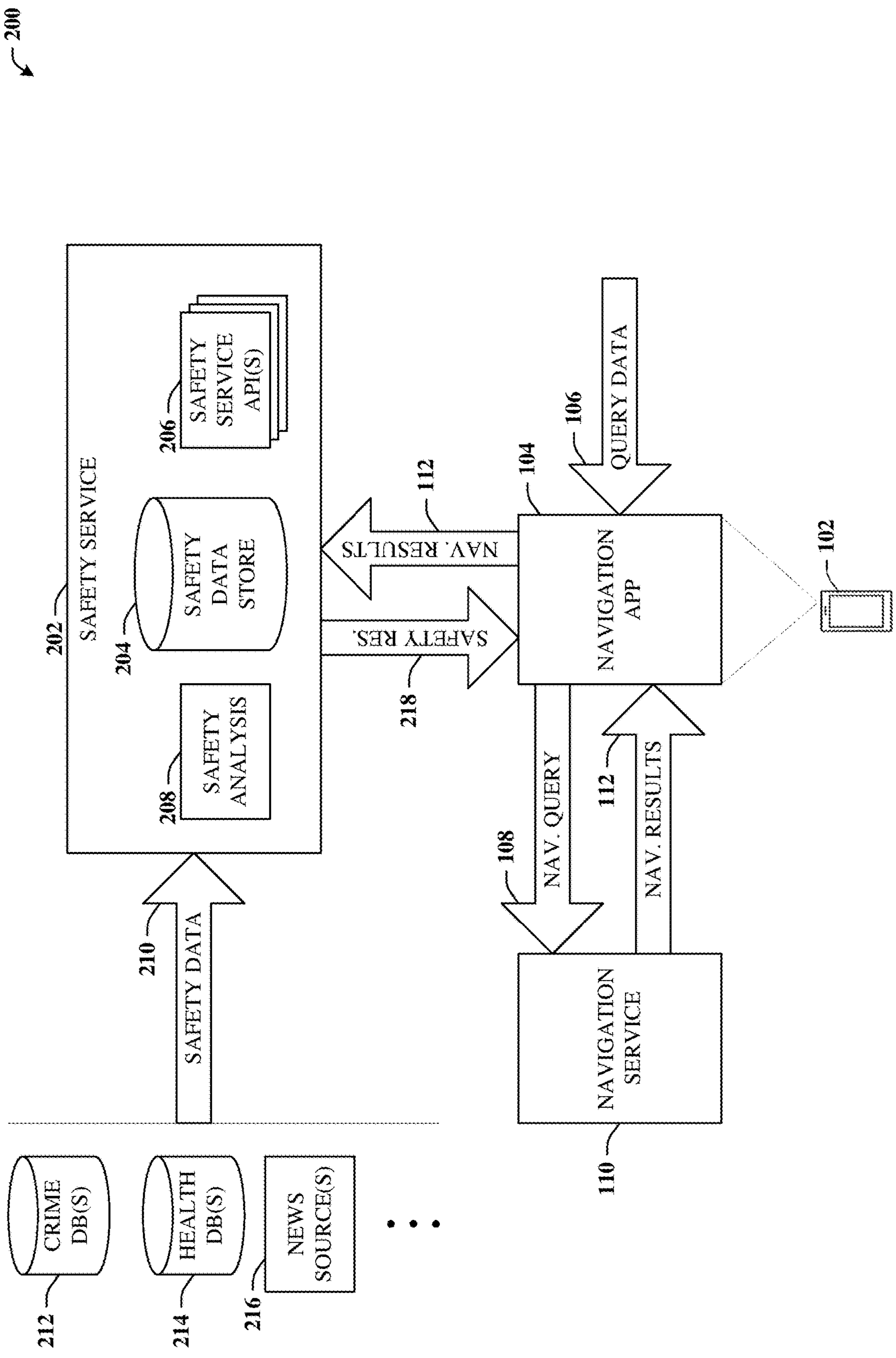
FIG. 2 shows a schematic block diagram illustrating one example of a safety service in the context of serving a navigation application in accordance with certain embodiments of this disclosure.

For example, the disclosed subject matter can bring new navigation solutions or techniques to relieve some of the consumer's concerns, which can be introduced with reference to FIG. 2. In that regard, the disclosed subject matter can maintain a safety data store comprising various raw or managed safety data relating to substantially any type of safety concern, be it crime, contagious pathogens, or the like. This information can be stored or indexed according to geographic areas and can be provided as a service such as to navigation application 104, a weather application, a real estate application, or other geographical based application, or the like.

Turning now to FIG. 2, a schematic block diagram 200 is presented. Diagram 200 illustrates one example of safety service 202 in the context of serving navigation application 104 in accordance with certain embodiments of this disclosure. Initially, it is observed that safety service 202 can comprise safety data store 204, which can store various safety metrics or ratings and can do so according to some geographic format or indexing. Safety service 202 can comprise one or more safety service API(s) 206 that can be leveraged to collect safety data 210, to serve data to clients such as UE 102 and/or navigation app 104 or the like.

Safety service 202 can further comprise safety analysis component 208 that can collect safety data 210 in a raw form, parse that information, extract the relevant portions, and store safety data 210 in a desired format to safety data store 204, which is typically in accordance to a geographical or location-based format. It is appreciated that safety data 210 can be collected from various crime data stores 212, various health data stores 214, various news source 216, or from any other suitable source or entity, whether public or proprietary. It is appreciated that safety data 120 might also be collected from a cellular or other network provider such as information relating to a location of 911 or enhanced 911 (E911) calls. Safety data 210 can be retrieved according to scheduled interactions (e.g., retrieve and analyze nightly) or can be event driven such as instructions to immediately retrieve new data in response to that data being updated or becoming available.

Consider again a user performing a search for a given POI such as a gas station, a restaurant, an entertainment venue, or another POI. That POI can be input to navigation app 104 as query data 106. Navigation app 104 can then transmit navigation query 108 to an associated navigation service 110. Navigation query 108 can include all or portions of query data 106 as well as certain other information such as a current location of UE 102, certain user preferences or settings, if applicable, or any other suitable information. In response, navigation service 110 can return navigation results 112. In some embodiments, navigation results 112 can represent a group of POIs that satisfy the original query, such as a list of gas stations that are within some distance of the current location of UE 102. This list is typically sorted according to travel distance or in some cases travel time.

In some embodiments, navigation results 112 can relate to a single POI, such as in the case where a particular POI from the initial list was selected as the destination. In this case, navigation results 112 can include various different travel paths from the current location of UE 102 to the location of the selected POI.

In either case, navigation results 112 (or some suitable representation) can be transmitted to safety service 202, potentially along with other data such as user preferences or settings, current location, and so forth. In response, UE 102 and/or navigation app 104 can receive safety results 218 that can be representative of one or more safety metrics associated with locations suggested by navigation results 112. Navigation results 112 can be compared to safety-based settings or other data to determine that one or more of navigation results 112 does not satisfy a defined safety criterion.

In some embodiment, navigation app 104 can then present some alert or warning indicia along with the presentation of navigation results 112 received from navigation service 110. For example, if navigation results 112 initially present the five nearest POIs of the type queried (e.g., the five nearest gas stations) and safety results 218 indicates two of those five have concerning safety metrics, then those two results can be presented along with the safety warning indicia based on safety results 218.

In some embodiments, the results (e.g., the five nearest gas stations) can be ordered according to a given safety metric such that results that do satisfy the safety metric can be presented before results that do not satisfy the safety metric. In some embodiments, locations that are determined to fail to satisfy the safety metric can be indicated on a map associated with navigation app 104. For example, areas that do not satisfy the safety metric can be identified on the map in red or other suitable colors, highlighting, or accentuation.

In some embodiments, the safety warning indicia can be presented with respect to a selected POI (e.g., selected from the group of five nearest POI) if it is determined the safety metric is unsatisfactory. In some embodiments, safety service 202 can suggest other POIs that have satisfactory safety metrics, which may not be included in navigation results 112 because those are typically determined based on distance rather than safety. Such suggestions can be included in safety results 218, which can be presented by UE 102 and/or navigation app 104.

In some embodiments, the safety warning indicia can be presented along with potential navigation paths. For instance, suppose navigation results 112 relates to several different navigation paths to the selected POI and safety service 202 determines that one of those paths is routed through a location having a potentially concerning safety metric. In that case, the identified path can be appended with the safety warning indicia.

It is to be understood that although safety service 202 and navigation service 110 are treated herein as separate entities, in some embodiments, these two services can be provided by the same entity. In other words, safety service 202 can, in some embodiments be integrated into navigation service 110 and in some cases APIs relied upon to facilitate communication can be the same. In other embodiments, the two services can be provided by distinct entities, as shown herein. Additional aspects or embodiments are discussed in connection with the remainder of the drawings.

Example Systems

Figure 3:
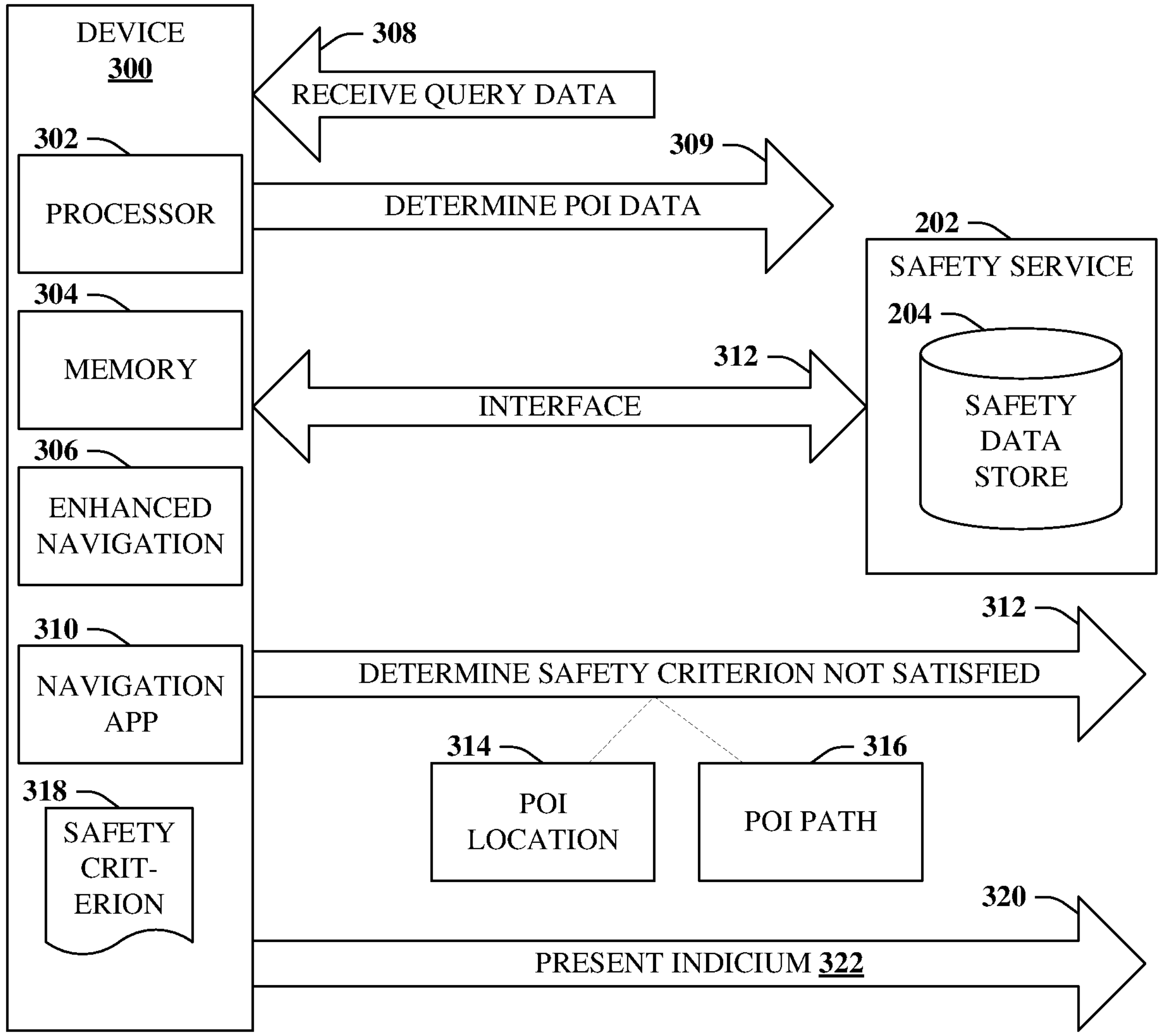
FIG. 3 depicts a schematic block diagram illustrating an example device that can expand or supplement point-of-interest (POI) information associated with a navigation system based on a safety criterion in accordance with certain embodiments of this disclosure.

Referring now to FIG. 3, a schematic block diagram is depicted illustrating an example device 300 that can expand point-of-interest (POI) information associated with a navigation system based on a safety criterion in accordance with certain embodiments of this disclosure. For example, device 300 can be a network device of a network provider that provides network services to customers such as enhanced navigation 306 service. Device 300 can comprise a processor 302 that can be specifically configured to provide enhanced navigation 306. Device 300 can also comprise memory 304 that stores executable instructions that, when executed by processor 302, can facilitate performance of operations. Processor 302 can be a hardware processor having structural elements known to exist in connection with processing units or circuits, with various operations of processor 302 being represented by functional elements shown in the drawings herein that can require special-purpose instructions, for example, stored in memory 304 and/or an enhanced navigation 306 component or circuit. Along with these special-purpose instructions, processor 302 and/or device 300 can be a special-purpose device. Further examples of the memory 304 and processor 302 can be found with reference to FIG. 10. It is to be appreciated that device 300 or computer 1002 can represent a server device of a communications network or a user equipment device and can be used in connection with implementing one or more of the systems, devices, or components shown and described in connection with FIG. 3 and other figures disclosed herein.

Hence, one likely embodiments is that device 300 represents a user equipment (UE) such as mobile device 102, a wearable device, a vehicle navigation device, a personal computer, or another computing device or similar.

As illustrated at reference numeral 308, device 300 can receive query data. This query data can represent a type of a particular POI, exemplary examples of which can be a gas station, library or other suitable POI. The query data can be input to navigation app 310 or other suitable app (e.g., any location services app) that is executing on device 300. In response, device 300 can, at reference numeral 309, determine POI data. The POI data can comprise a destination result that satisfies the query received at reference numeral 308. In some instances the POI data can comprise multiple destination results from which a selection is made to particularly select the destination result.

As illustrated at reference numeral 312, device 300 can interface to safety service 202 detailed in connection with FIG. 2. Safety service 202 can comprise safety data store 204 that stores safety data according to geographic location. In response to interfacing with safety data service 202, device 300 can perform determination 312. Determination 312 can comprise determining that the destination result has a safety rating that does not satisfy defined safety criterion 318. Defined safety criterion 318 can relate to a crime rate metric (e.g., robbery, carjacking, or the like) at a particular location or area, a health services metric (e.g., covid cases or the like) at a particular location or area, or another suitable safety metric at a particular location or area.

Appreciably, determination 312 can be made in connection with POI location 314 (e.g., a location of the library or other destination result) or in connection with POI path (e.g., a location along a path). In other words, POI data that is determined at 309 can relate to a location of the destination result (e.g., the selected library or gas station) or a path to that location of the destination result. Thus, determination 312 can relate to either determining that the location of the destination result does not satisfy defined safety criterion 318 or determining that the path to the location of the destination result does not satisfy defined safety criterion 318, for instance because the path intersects a location or area that does not satisfy defined safety criterion 318. It is appreciated that various elements of defined safety criterion 318 can be highly configurable and flexible, which is further discussed in connection with FIGS. 5A and 5B.

At reference numeral 320, device 300 can present indicium 322. Indicium 322 can indicate that defined safety criterion 318 is not satisfied. Indicium 322 can be any suitable indicia that suitably informs an alert or warning that defined safety criterion 318 is not satisfied with respect to some element of a suggested, displayed, or selected POI. Such can relate to text color or background color, display of a symbol or substantially any other visual cue to alert a user. One non-limiting example of which is provided in connection with FIG. 4.

Figure 4:
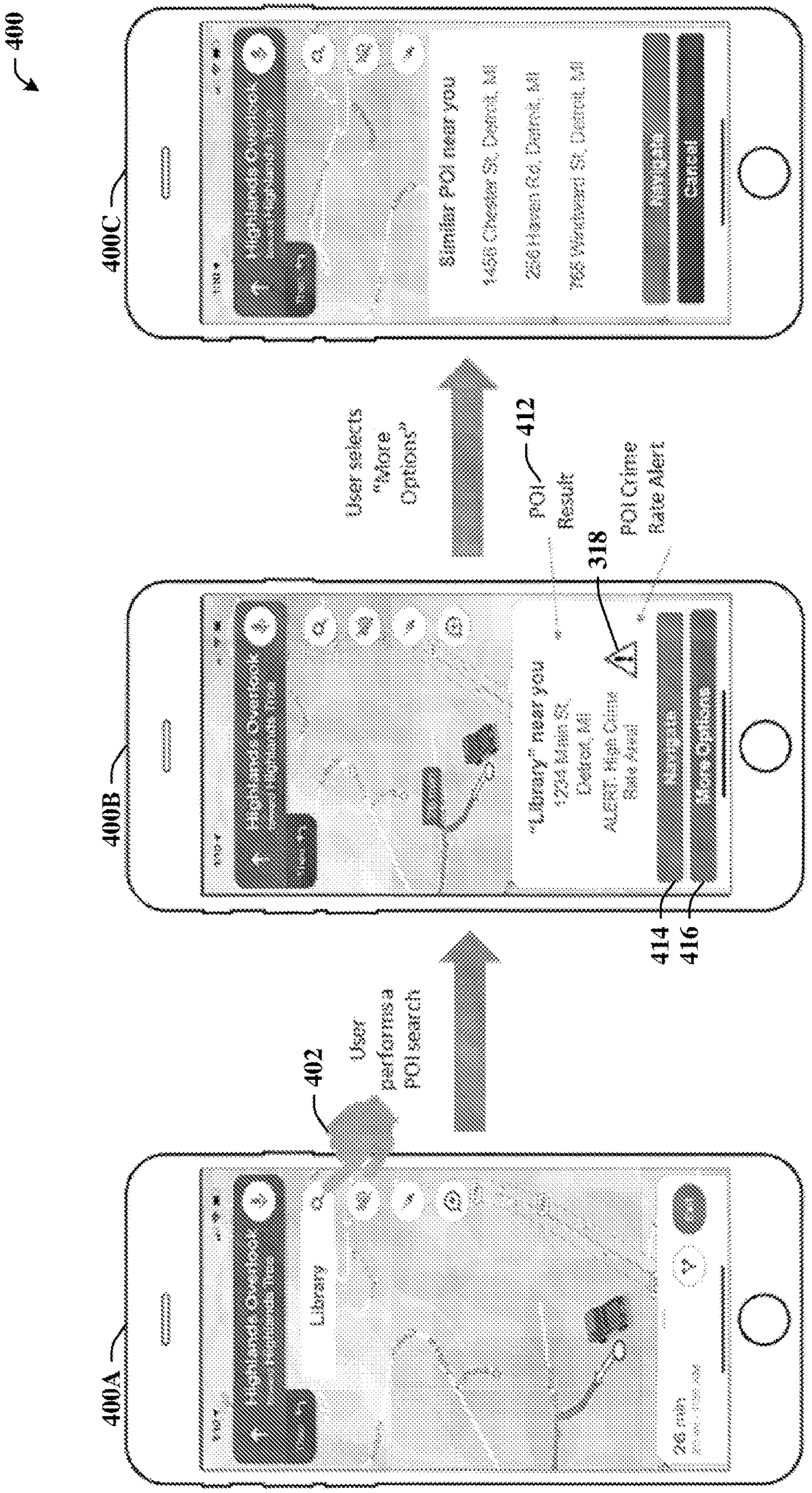
FIG. 4 depicts a graphical illustration showing various states of a navigation app presentation by a suitable device in accordance with certain embodiments of this disclosure.

Turning now to FIG. 4, a graphical illustration 400 is depicted illustrating various states of a navigation app presentation by a suitable device in accordance with certain embodiments of this disclosure. Presentation state 400A depicts a user 402 inputting query data relating to a type of POI. In this example, user 402 is searching for a library. Such can correspond to the receipt of query data illustrated in connection with reference numeral 308 of FIG. 3.

Presentation state 400B depicts a state after user 402 has selected a specific library. In this case a library at 1234 Main street as illustrated by POI result 412. Based on this selected POI, certain information can be provided to safety service 202, as illustrated in connection with FIG. 2, and it can be determined that that library does not meet some safety criterion. As such indicia 318 is presented along with the words "ALERT: High Crime Rate Area!" which can also be included as an example of indicia 318.

In this use case scenario, additional objects can be presented such as navigate instruction 414 and more options instruction 416. For example, it can be assumed that user 402 is now aware of the high crime warning, but has the option of ignoring that by selecting navigate instruction 414, which may send the presentation to a different state as it might have been in otherwise (e.g., showing a path or directions to the selected library). On the other hand, if more options instruction 416 is selected, then presentation state 400C can be invoked. In this case, it can be assumed that user 402 is sufficiently worried about the high crime rate. Hence, alternative suggestions can be presented, and these suggestions can be specifically chosen for display as a function of some safety metric rather than being chosen exclusively based on travel distance or travel time, as navigation apps tend to do.

Embodiments presented thus far have generally focused on advantageously tagging an ordinary search result with indicium 318 in response to a determination that that search result fails to satisfy some safety metric or threshold. Thus, the user can be made aware of the particular safety concern relating to a particular POI or a particular path to that POI. The user can choose to heed the alert by selecting an alternative POI or route or the user can ignore it and select the navigation app suggestions anyway.

However, other embodiments can exist as well that can leverage access to safety service 202 in a similar way with different results or goals. For example, while previously detailed embodiments generally described presenting the indicium 318 to inform a user that a safety metric was not satisfied, in addition, or alternatively, other systems can effectively surface results that satisfy the safety metric or filter results that do not satisfy the safety metric. In other words, serving given results can be a function of the safety metric and some travel distance or travel time metric rather than simply being a function of the travel distance or the travel time, which is further detailed in connection with FIG. 5A.

Figure 5A:
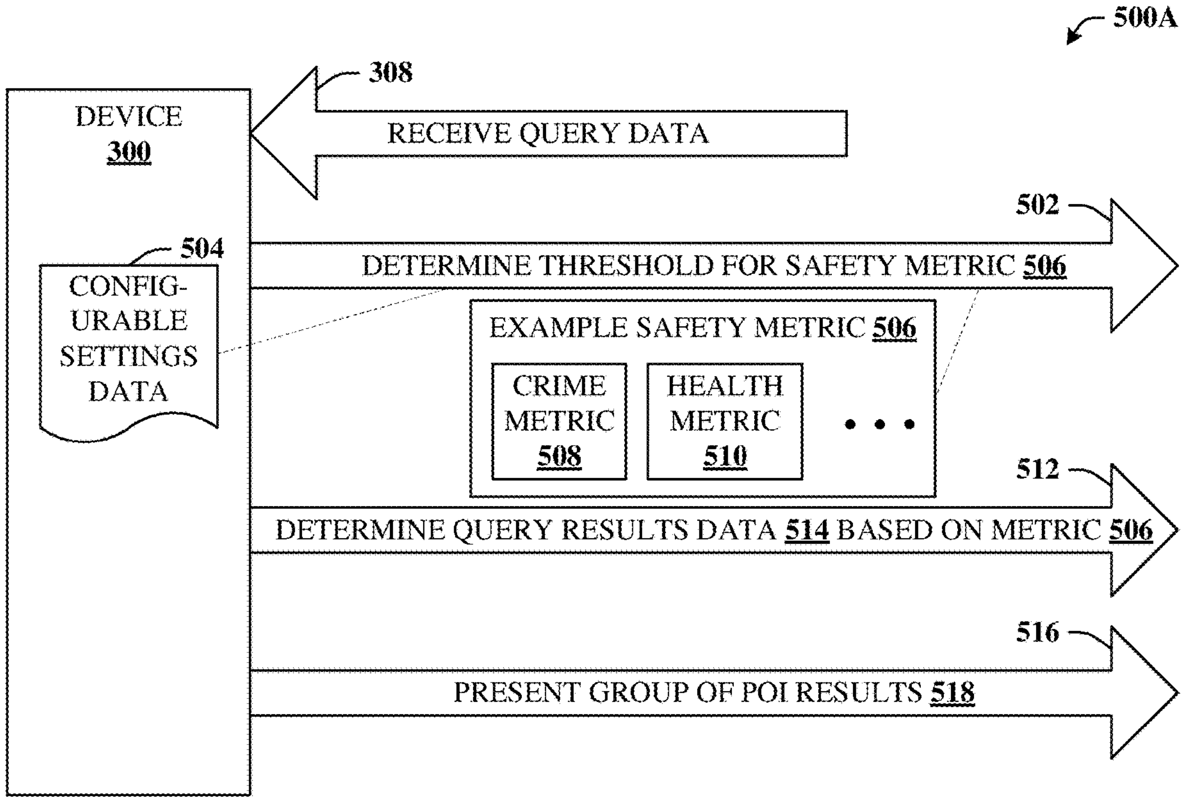
FIG. 5A shows a schematic block diagram illustrating an example device that can determine POI results as a function of a safety metric threshold in accordance with certain embodiments of this disclosure.

Referring now to FIG. 5A, a schematic block diagram 500A is depicted illustrating example device 300 that can determine POI results as a function of a safety metric threshold in accordance with certain embodiments of this disclosure. As with other embodiments, in this embodiment, device 300 can receive query data as illustrated at reference numeral 308, such as data input to a navigation app.

As depicted at reference numeral 502, device 300 can determine a threshold associated with a safety metric 506. Determination 502 can be accomplished based on configurable settings data 504. For example, any given safety metric 506 can have an associated configurable setting within configurable settings data 504, which can be set by a user to his or her desire. For instance, one of many different crime metrics 508, one of many different health metrics 510, and so on can be set according to a desired value or weight. In some instances, a single setting can affect various groups of crime, health, or overall safety metrics. These settings can be assigned to respective values or can otherwise represent one or more thresholds.

At determination 512, device 300 can determine query results data 516 in order to satisfy the user's query relating to a particular POI. For example, if the user input's 'library', query results data 516 can provide a group of library-type POIs from which the user can select one. Advantageously, query results data 514 can be a function of both distance from a current location of device 300 and the threshold associated with safety metric 506. Query results data 514 can therefore automatically filter out any unsatisfactory POIs that might otherwise appear in traditional results.

At reference numeral 516, device 300 can present the group of POI results 518 that reflect query results data 514, e.g., to a user interface associated with the navigation application and/or device 300. In this case, only results that satisfy both the original query as well as configurable settings data 504 with respect to safety metric 506 need be presented. Hence, in some embodiments, indicium 318 is not presented because all results have already been determined to satisfy the threshold for safety metric 506. In some embodiments, indicium 318 can be presented such as in cases where the threshold for safety metric 506 is only narrowly satisfied or similar.

Figure 5B:
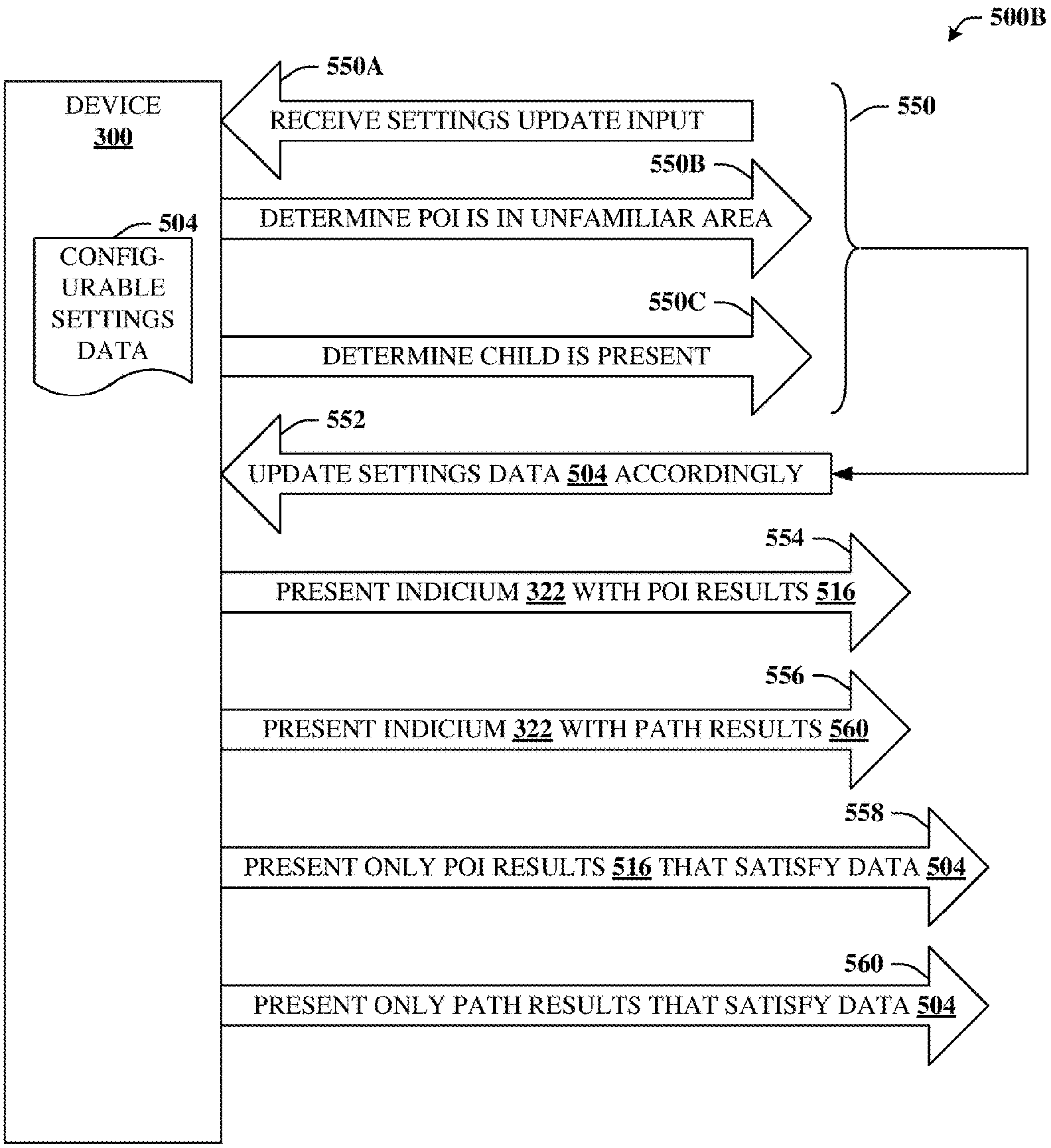
FIG. 5B shows a schematic block diagram illustrating an example device that can provide for additional aspects or elements relating to providing safety metrics in accordance with certain embodiments of this disclosure.

With reference now to FIG. 5B, a schematic block diagram 500B is depicted illustrating example device 300 that can provide for additional aspects or elements relating to providing safety metrics in accordance with certain embodiments of this disclosure. As discussed previously, configurable settings data 504 can be used to set thresholds relating to safety metrics 506. It is appreciated that any such threshold can be modified in many ways, examples of which are detailed in connection with reference numeral 550.

For example, as illustrated by reference numeral 550A, device 300 can receive settings update input. For example, a value can be specified (e.g., 0-100) or a slider input mechanism can be adjusted to set an importance or weight that is to be assigned to a given safety metric 506. In addition, a given safety metric 506 can have multiple possible values that are, e.g., situational-based. For example, many users might be willing to ignore warnings when quite familiar with the area, but not as likely for unfamiliar areas. As another example, many users might prioritize safety metrics when, e.g., a child is present or proximal (e.g., in the car), beyond what might be tolerated when alone. Thus, a given setting of configurable settings data 504 can have multiple values or settings, such as a default setting, a setting for an unfamiliar area, a setting for when a child is present, and so forth.

Accordingly, referring to determination 550B, device 300 can determine a given POI is in an unfamiliar area and/or determine that the POI is beyond familiar regions according to a defined familiarity criterion. By way of example, this familiarity criterion and, by proxy, determination 550B, can be based on a distance from the user's residence, based on travel history data, based on travel frequency data, or based on other suitable information. Typically, this type of data is available to device 300 and/or navigation app 310, which can be accessed to provide determination 550B. Alternatively, determination 550B can occur as a result of input from the user, such as selecting a UI element or speaking a catchphrase such as "I'm not familiar with this area".

As another example, consider determination 550C, in which device 300 can determine a child is present, such as being proximal or present in the vehicle during navigation. Device 300 can similarly make determination 550C in response to input from the user such as a spoken phrase or selecting an UI element to indicate such. In other embodiments, suitable information can be received from a device of the vehicle such as an environmental system that gathers data from various sensors or determined from other information such as scheduling data (e.g., user was scheduled to pick up kids from school at 3:00 pm, and has not yet returned home, and so forth) or from sensors associated with device 300 (e.g., microphone detects sounds of children or the like).

Regardless, it is appreciated that reference numeral 550, of which 550A-C are representative examples, illustrates various mechanisms by which a configurable setting can be updated, as illustrated update 552. Update 552 can switch from one configured setting to another (e.g., switch from the default threshold for crime metric X to the 'child present' threshold for crime metric X) or simply increment/decrement the threshold (e.g., as a result of being in an unfamiliar area, increase/decrease the threshold by a value of Y). As one result of update 552, query results data 514 can differ as certain POIs may now meet the safety metric threshold or may no longer meet the safety metric threshold. As another result, presentation of indicium 322 may no longer apply to certain results or may newly apply to other results.

In some embodiments, such as those in which POI results 516 that do not satisfy the safety metric are presented, those POI results 516 can be presented along with indicium 322, as illustrated at reference numeral 554. Such can include tagging certain nearby POIs that satisfy the initial query as well as different routes to a selected POI, as illustrated at reference numeral 556. In some embodiments, such as those that filter based on the safety metric, device 300 can present only those POI results 516 that satisfy the safety metric and/or the threshold determined from configurable settings data 504, as illustrated by reference numeral 558. As illustrated at reference numeral 560 when POI results 516 relate to potential paths to a selected POI, then those paths can be filtered out in a similar way. Hence, only paths that satisfy the safety metric and/or the threshold determined from configurable settings data 504 can be presented.

Example Methods

Figure 6:
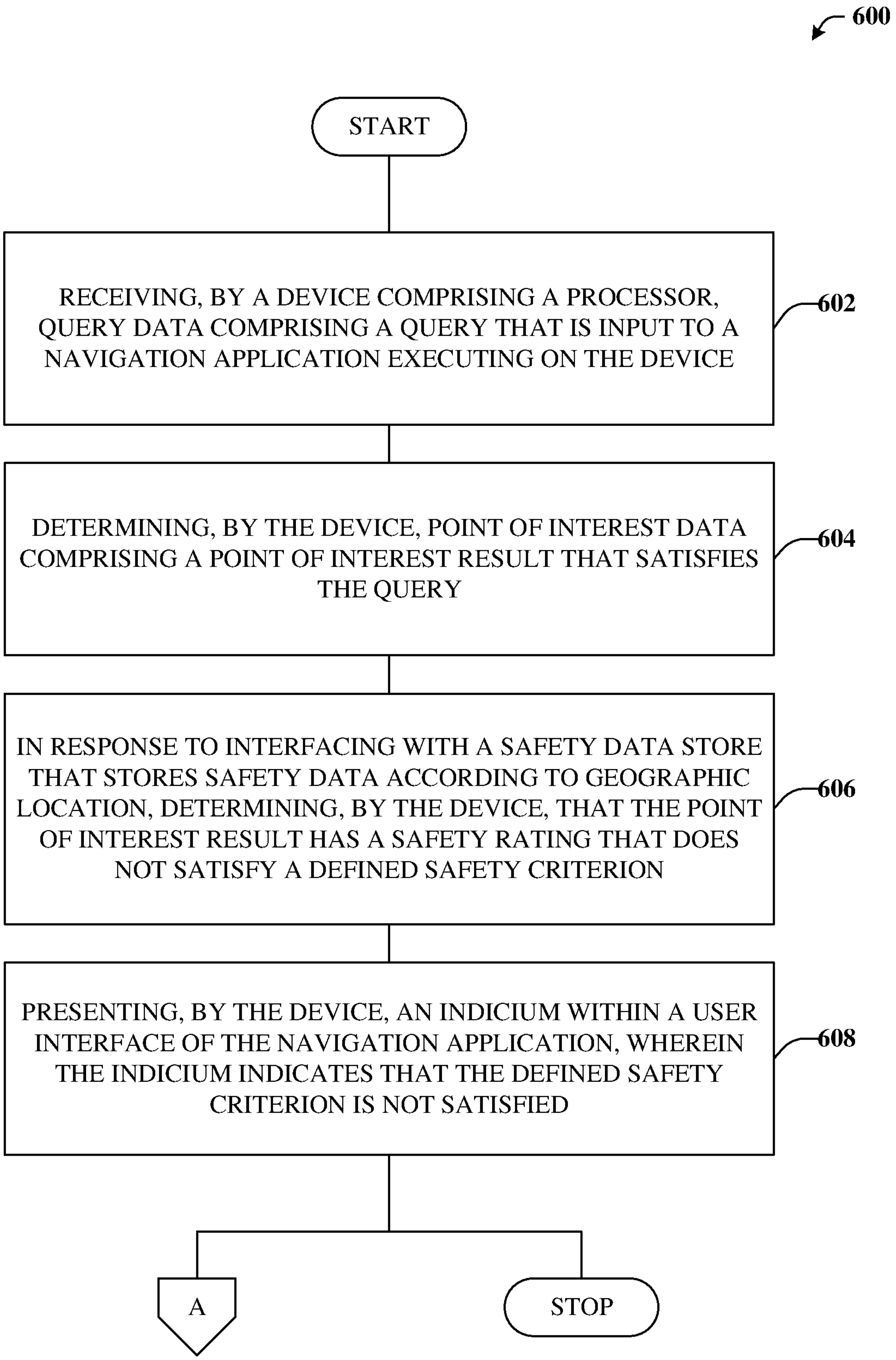
FIG. 6 illustrates an example method that can supplement POI information associated with a navigation system based on a safety criterion in accordance with certain embodiments of this disclosure.
Figure 7:
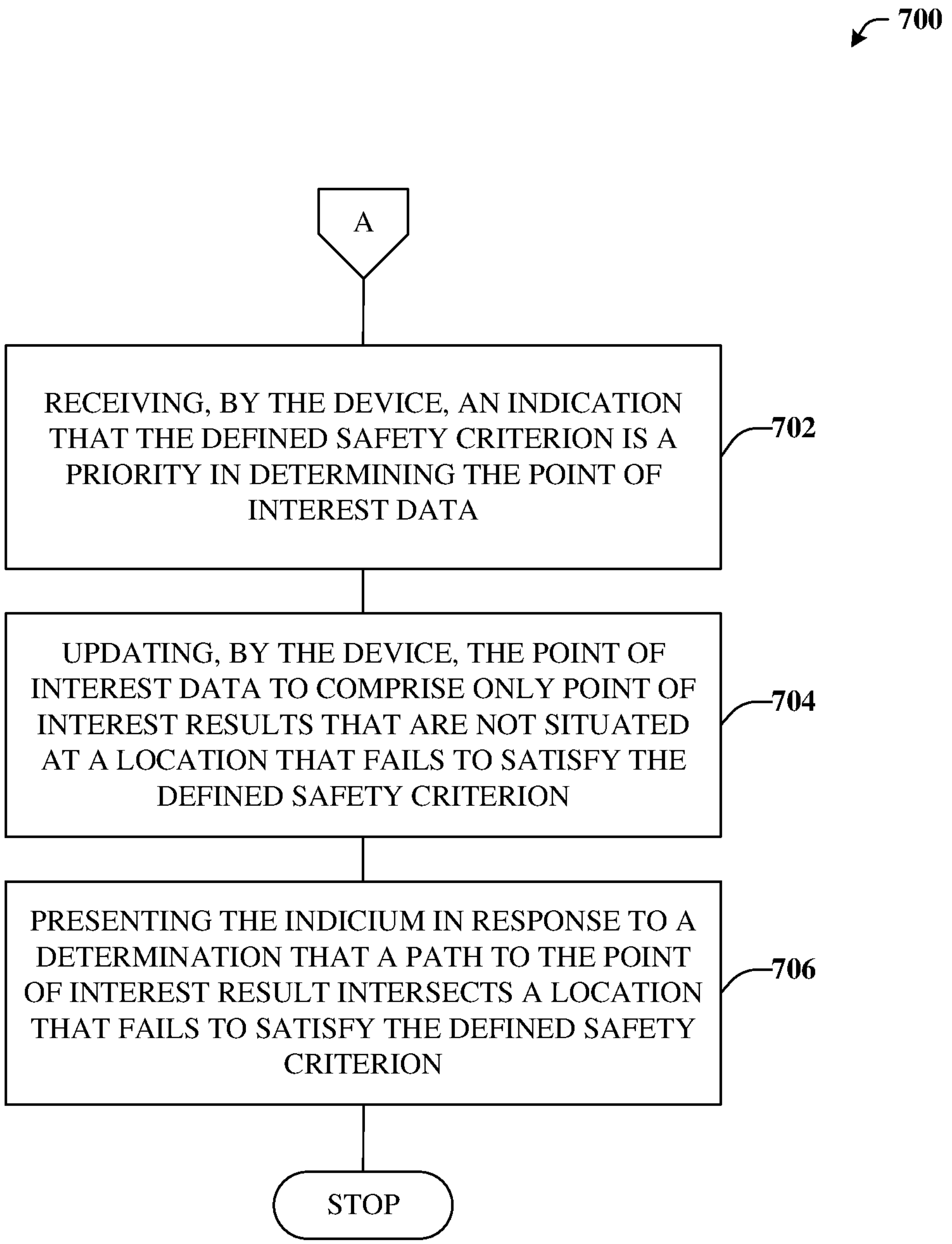
FIG. 7 illustrates an example method that can provide for additional elements or aspects in connection with supplementing POI information associated with a navigation system based on a safety criterion in accordance with certain embodiments of this disclosure.

FIGS. 6 and 7 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Turning now to FIG. 6, exemplary method 600 is depicted. Method 600 can supplement POI information associated with a navigation system based on a safety criterion in accordance with certain embodiments of this disclosure. For example, at reference numeral 602, a device comprising a processor can receive query data. This query data can comprise a query that is input to a navigation application executing on the device such as, e.g., 'gas station', 'restaurant', 'library' or any other suitable POI.

At reference numeral 604, the device can determine point of interest data comprising a point of interest result that satisfies the query. In other words, point of interest data can be one or more points of interest results that satisfy the query that is input to the navigation application, such as one or more nearby gas stations or restaurants. In some embodiments, the point of interest data can comprise one or more paths to a selected point of interest results.

At reference numeral 606, in response to interfacing with a safety data store that stores safety data according to geographic location, the device can determine that the point of interest result has a safety rating that does not satisfy a defined safety criterion. Such can be based on a location of the point of interest result or based on a location that intersects a path to the point of interest.

At reference numeral 608, the device can present an indicium within a user interface of the navigation application. This indicium can indicate that the defined safety criterion is not satisfied based on an icon, symbol, text, coloring or font scheme or the like. Hence, the indicium can be presented in connection with points of interest at locations in which the safety criterion is not satisfied or presented in connection with potential routes or paths to a selected point of interest that intersect a location in which the safety criterion is not satisfied. Method 600 can stop or proceed to insert A, which is further detailed in connection with FIG. 7.

With reference now to FIG. 7, exemplary method 700 is illustrated. Method 700 can provide for additional elements or aspects in connection with supplementing POI information associated with a navigation system based on a safety criterion in accordance with certain embodiments of this disclosure.

For example, at reference numeral 702, the device can receive an indication that the defined safety criterion is a priority in determining the point of interest data. For example, in response to the presentation of the indicium, a user might specify that alternative points of interest are desired that do satisfy the safety metric. Doing so can indicate that the safety criterion is a priority in this case, whereas requests to navigate to a point of interest despite the presence of the indicium can indicate that in this case the safety criterion is not a priority.

For example, in the event of the safety criterion being determined to be a priority, at reference 704, the device can update, the point of interest data to comprise only point of interest results that are not situated at a location that fails to satisfy the defined safety criterion. Additionally or alternatively, when the point of interest data comprises paths, those can be comprised only of paths that do not intersect a location that fails to satisfy the defined safety criterion.

Likewise, in other embodiments, at reference numeral 706, the device can present indicium in response to a determination that a path to the point of interest result intersects a location that fails to satisfy the defined safety criterion.

Example Operating Environments

Figure 8:
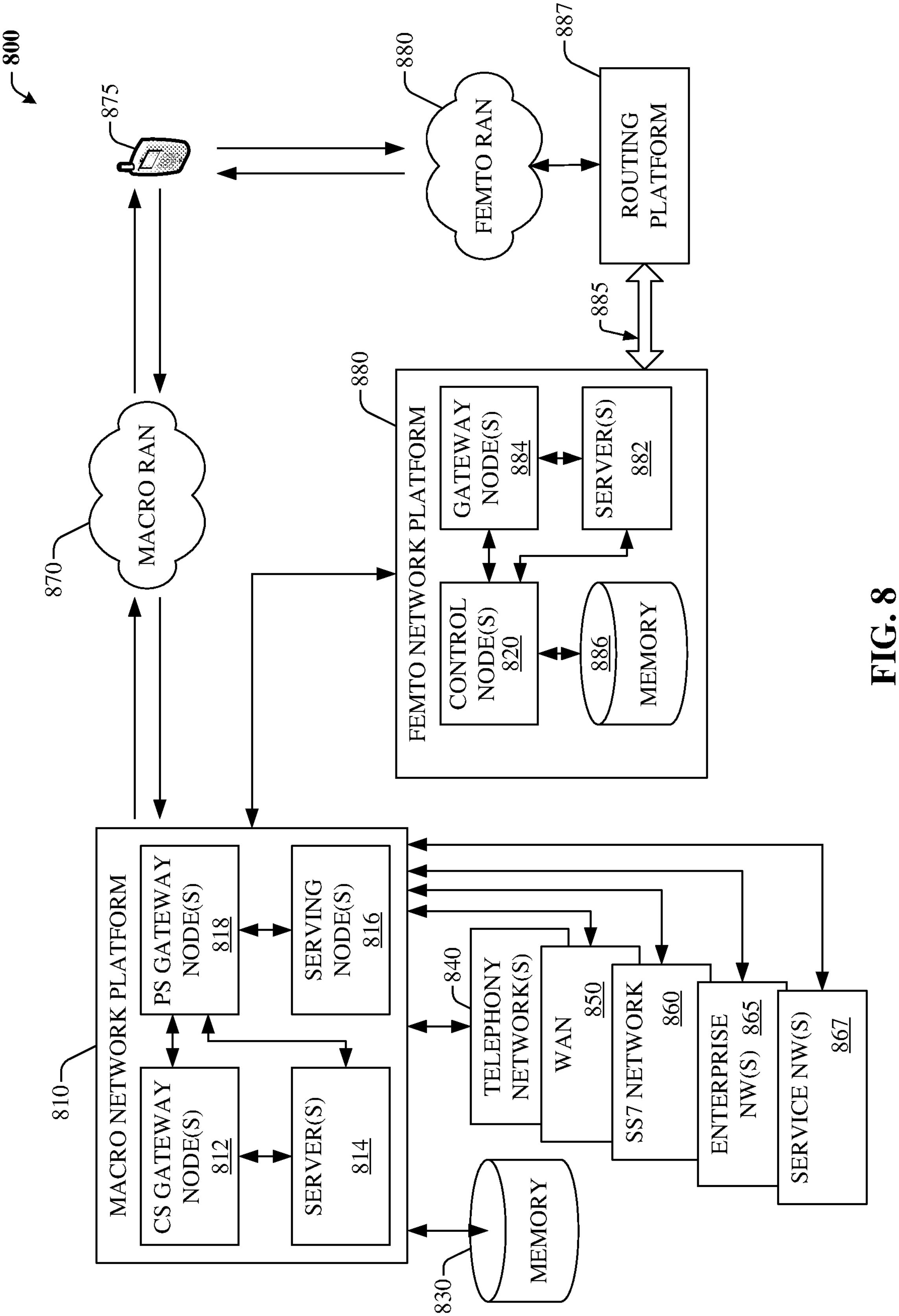
FIG. 8 illustrates a first example of a wireless communications environment with associated components that can be operable to execute certain embodiments of this disclosure.

To provide further context for various aspects of the subject specification, FIG. 8 illustrates an example wireless communication environment 800, with associated components that can enable operation of a femtocell enterprise network in accordance with aspects described herein. Wireless communication environment 800 comprises two wireless network platforms: (i) A macro network platform 810 that serves, or facilitates communication with, user equipment 875 via a macro radio access network (RAN) 870. It should be appreciated that in cellular wireless technologies (e.g., 4G, 3GPP UMTS, HSPA, 3GPP LTE, 3GPP UMB, 5G), macro network platform 810 is embodied in a Core Network. (ii) A femto network platform 880, which can provide communication with UE 875 through a femto RAN 890, linked to the femto network platform 880 through a routing platform 887 via backhaul pipe(s) 885. It should be appreciated that femto network platform 880 typically offloads UE 875 from macro network, once UE 875 attaches (e.g., through macro-to-femto handover, or via a scan of channel resources in idle mode) to femto RAN.

It is noted that RAN comprises base station(s), or access point(s), and its associated electronic circuitry and deployment site(s), in addition to a wireless radio link operated in accordance with the base station(s). Accordingly, macro RAN1370 can comprise various coverage cells, while femto RAN 890 can comprise multiple femto access points or multiple metro cell access points. As mentioned above, it is to be appreciated that deployment density in femto RAN 890 can be substantially higher than in macro RAN 870.

Generally, both macro and femto network platforms 810 and 880 comprise components, e.g., nodes, gateways, interfaces, servers, or platforms, that facilitate both packet-switched (PS) (e.g., internet protocol (IP), Ethernet, frame relay, asynchronous transfer mode (ATM)) and circuit-switched (CS) traffic (e.g., voice and data) and control generation for networked wireless communication. In an aspect of the subject innovation, macro network platform 810 comprises CS gateway node(s) 812 which can interface CS traffic received from legacy networks like telephony network(s) 840 (e.g., public switched telephone network (PSTN), or public land mobile network (PLMN)) or a SS7 network 860. Circuit switched gateway 812 can authorize and authenticate traffic (e.g., voice) arising from such networks. Additionally, CS gateway 812 can access mobility, or roaming, data generated through SS7 network 860; for instance, mobility data stored in a VLR, which can reside in memory 830. Moreover, CS gateway node(s) 812 interfaces CS-based traffic and signaling and gateway node(s) 818. As an example, in a 3GPP UMTS network, gateway node(s) 818 can be embodied in gateway GPRS support node(s) (GGSN).

In addition to receiving and processing CS-switched traffic and signaling, gateway node(s) 818 can authorize and authenticate PS-based data sessions with served (e.g., through macro RAN) wireless devices. Data sessions can comprise traffic exchange with networks external to the macro network platform 810, like wide area network(s)

(WANs) 850; it should be appreciated that local area network(s) (LANs) can also be interfaced with macro network platform 810 through gateway node(s) 818. Gateway node(s) 818 generates packet data contexts when a data session is established. To that end, in an aspect, gateway node(s) 818 can comprise a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can comprise multiple flows that can be generated through server(s) 814. It is to be noted that in 3GPP UMTS network(s), gateway node(s) 818 (e.g., GGSN) and tunnel interface (e.g., TTG) comprise a packet data gateway (PDG).

Macro network platform 810 also comprises serving node(s) 816 that convey the various packetized flows of information or data streams, received through gateway node(s) 818. As an example, in a 3GPP UMTS network, serving node(s) can be embodied in serving GPRS support node(s) (SGSN).

As indicated above, server(s) 814 in macro network platform 810 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can comprise add-on features to standard services provided by macro network platform 810. Data streams can be conveyed to gateway node(s) 818 for authorization/authentication and initiation of a data session, and to serving node(s) 816 for communication thereafter. Server(s) 814 can also effect security (e.g., implement one or more firewalls) of macro network platform 810 to ensure network's operation and data integrity in addition to authorization and authentication procedures that CS gateway node(s) 812 and gateway node(s) 818 can enact. Moreover, server(s) 814 can provision services from external network(s), e.g., WAN 850, or Global Positioning System (GPS) network(s) (not shown). It is to be noted that server(s) 814 can comprise one or more processor configured to confer at least in part the functionality of macro network platform 810. To that end, the one or more processor can execute code instructions stored in memory 830, for example.

In example wireless environment 800, memory 830 stores information related to operation of macro network platform 810. Information can comprise business data associated with subscribers; market plans and strategies, e.g., promotional campaigns, business partnerships; operational data for mobile devices served through macro network platform; service and privacy policies; end-user service logs for law enforcement; and so forth. Memory 830 can also store information from at least one of telephony network(s) 840, WAN(s) 850, or SS7 network 860, enterprise NW(s) 865, or service NW(s) 867.

Femto gateway node(s) 884 have substantially the same functionality as PS gateway node(s) 818. Additionally, femto gateway node(s) 884 can also comprise substantially all functionality of serving node(s) 816. In an aspect, femto gateway node(s) 884 facilitates handover resolution, e.g., assessment and execution. Further, control node(s) 820 can receive handover requests and relay them to a handover component (not shown) via gateway node(s) 884. According to an aspect, control node(s) 820 can support RNC capabilities.

Server(s) 882 have substantially the same functionality as described in connection with server(s) 814. In an aspect, server(s) 882 can execute multiple application(s) that provide service (e.g., voice and data) to wireless devices served through femto RAN 890. Server(s) 882 can also provide security features to femto network platform. In addition, server(s) 882 can manage (e.g., schedule, queue, format . . . ) substantially all packetized flows (e.g., IP-based) it generates in addition to data received from macro network platform 810. It is to be noted that server(s) 882 can comprise one or more processor configured to confer at least in part the functionality of macro network platform 810. To that end, the one or more processor can execute code instructions stored in memory 886, for example.

Memory 886 can comprise information relevant to operation of the various components of femto network platform 880. For example, operational information that can be stored in memory 886 can comprise, but is not limited to, subscriber information; contracted services; maintenance and service records; femto cell configuration (e.g., devices served through femto RAN 890; access control lists, or white lists); service policies and specifications; privacy policies; add-on features; and so forth.

It is noted that femto network platform 880 and macro network platform 810 can be functionally connected through one or more reference link(s) or reference interface(s). In addition, femto network platform 880 can be functionally coupled directly (not illustrated) to one or more of external network(s) 840, 850, 860, 865 or 867. Reference link(s) or interface(s) can functionally link at least one of gateway node(s) 884 or server(s) 886 to the one or more external networks 840, 850, 860, 865 or 867.

Figure 9:
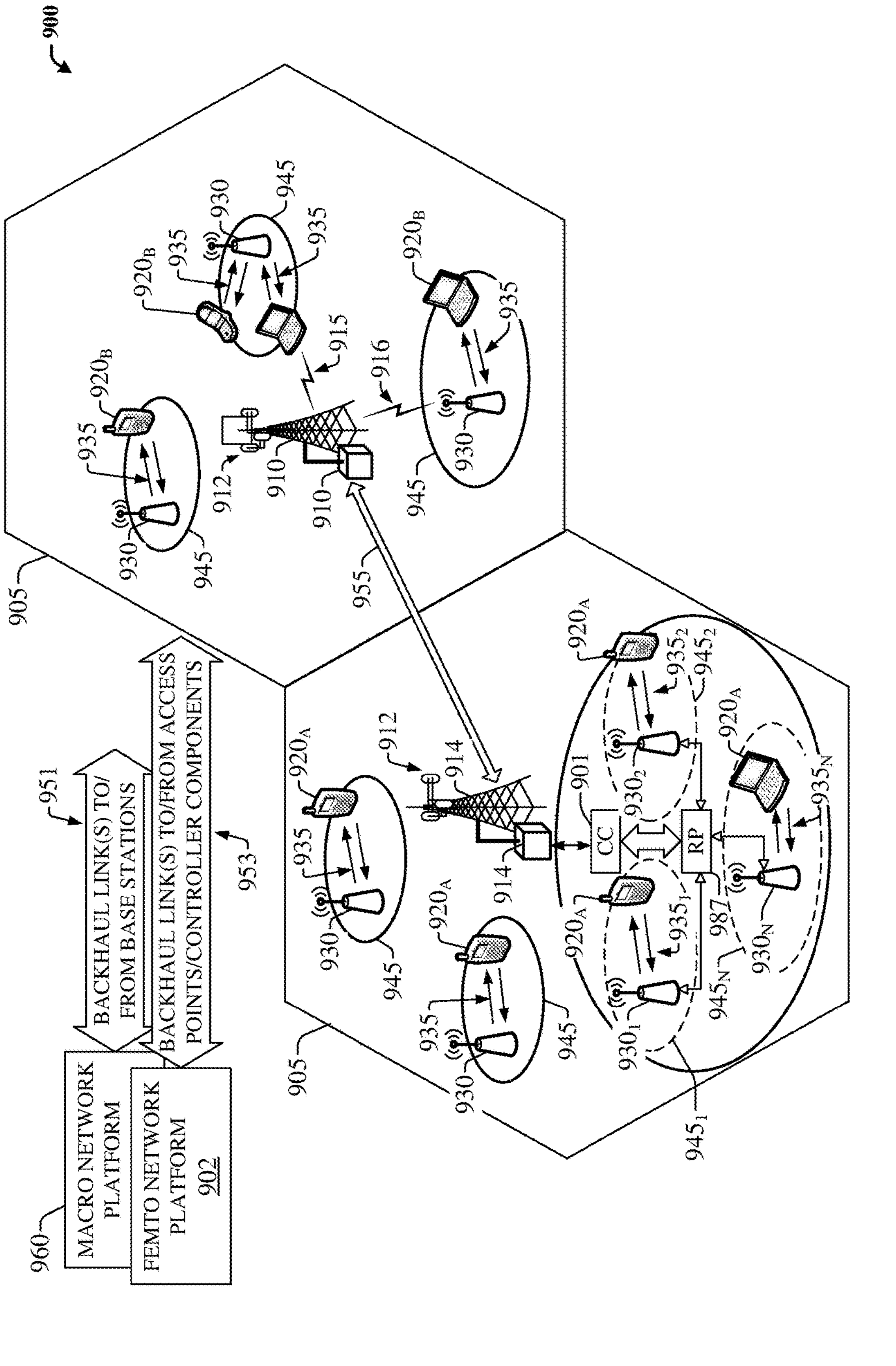
FIG. 9 illustrates a second example of a wireless communications environment with associated components that can be operable to execute certain embodiments of this disclosure.

FIG. 9 illustrates a wireless environment that comprises macro cells and femtocells for wireless coverage in accordance with aspects described herein. In wireless environment 905, two areas represent "macro" cell coverage; each macro cell is served by a base station 910. It can be appreciated that macro cell coverage area 905 and base station 910 can comprise functionality, as more fully described herein, for example, with regard to system 900. Macro coverage is generally intended to serve mobile wireless devices, like UE 920A, 920B, in outdoors locations. An over-the-air (OTA) wireless link 935 provides such coverage, the wireless link 935 comprises a downlink (DL) and an uplink (UL), and utilizes a predetermined band, licensed or unlicensed, of the radio frequency (RF) spectrum. As an example, UE 920A, 920B can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 910 communicates via backhaul link(s) 951 with a macro network platform 960, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 960 controls a set of base stations 910 that serve either respective cells or a number of sectors within such cells. Base station 910 comprises radio equipment 914 for operation in one or more radio technologies, and a set of antennas 912 (e.g., smart antennas, microwave antennas, satellite dish(es) . . . ) that can serve one or more sectors within a macro cell 905. It is noted that a set of radio network control node(s), which can be a part of macro network platform 960; a set of base stations (e.g., Node B 910) that serve a set of macro cells 905; electronics, circuitry or components associated with the base stations in the set of base stations; a set of respective OTA wireless links (e.g., links 915 or 916) operated in accordance to a radio technology through the base stations; and backhaul link(s) 955 and 951 form a macro radio access network (RAN). Macro network platform 960 also communicates with other base stations (not shown) that serve other cells (not shown). Backhaul link(s) 951 or 953 can comprise a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., LoS or non-LoS) backbone link. Backhaul pipe(s) 955 link disparate base stations 910. According to an aspect, backhaul link 953 can connect multiple femto access points 930 and/or controller components (CC) 901 to the femto network platform 902. In one example, multiple femto APs can be connected to a routing platform (RP) 987, which in turn can be connect to a controller component (CC) 901. Typically, the information from UEs 920A can be routed by the RP 987, for example, internally, to another UE 920A connected to a disparate femto AP connected to the RP 987, or, externally, to the femto network platform 902 via the CC 901, as discussed in detail supra.

In wireless environment 905, within one or more macro cell(s) 905, a set of femtocells 945 served by respective femto access points (APs) 930 can be deployed. It can be appreciated that, aspects of the subject innovation can be geared to femtocell deployments with substantive femto AP density, e.g., 94-107 femto APs 930 per base station 910. According to an aspect, a set of femto access points 9301-930N, with N a natural number, can be functionally connected to a routing platform 987, which can be functionally coupled to a controller component 901. The controller component 901 can be operationally linked to the femto network platform 902 by employing backhaul link(s) 953. Accordingly, UE 920A connected to femto APs 9301-930N can communicate internally within the femto enterprise via the routing platform (RP) 987 and/or can also communicate with the femto network platform 902 via the RP 987, controller component 901 and the backhaul link(s) 953. It can be appreciated that although only one femto enterprise is depicted in FIG. 9, multiple femto enterprise networks can be deployed within a macro cell 905.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can comprise legacy telecommunication technologies.

With respect to FIG. 9, in example embodiment 900, base station AP 910 can receive and transmit signal(s) (e.g., traffic and control signals) from and to wireless devices, access terminals, wireless ports and routers, etc., through a set of antennas $\mathbf{912}_1$-$\mathbf{912}_N$. It should be appreciated that while antennas $\mathbf{912}_1$-$\mathbf{912}_N$ are a part of communication platform 925, which comprises electronic components and associated circuitry that provides for processing and manipulating of received signal(s) (e.g., a packet flow) and signal(s) (e.g., a broadcast control channel) to be transmitted. In an aspect, communication platform 925 comprises a transmitter/receiver (e.g., a transceiver) 966 that can convert signal(s) from analog format to digital format upon reception, and from digital format to analog format upon transmission. In addition, receiver/transmitter 966 can divide a single data stream into multiple, parallel data streams, or perform the reciprocal operation. Coupled to transceiver 966 is a multiplexer/demultiplexer 967 that facilitates manipulation of signal in time and frequency space. Electronic component 967 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 967 can scramble and spread information (e.g., codes) according to substantially any code known in the art; e.g., Hadamard-Walsh codes, Baker codes, Kasami codes, polyphase codes, and so on. A modulator/demodulator 968 is also a part of operational group 925, and can modulate information according to multiple modulation techniques, such as frequency modulation, amplitude modulation (e.g., M-ary quadrature amplitude modulation (QAM), with M a positive integer), phase-shift keying (PSK), and the like.

Figure 10:
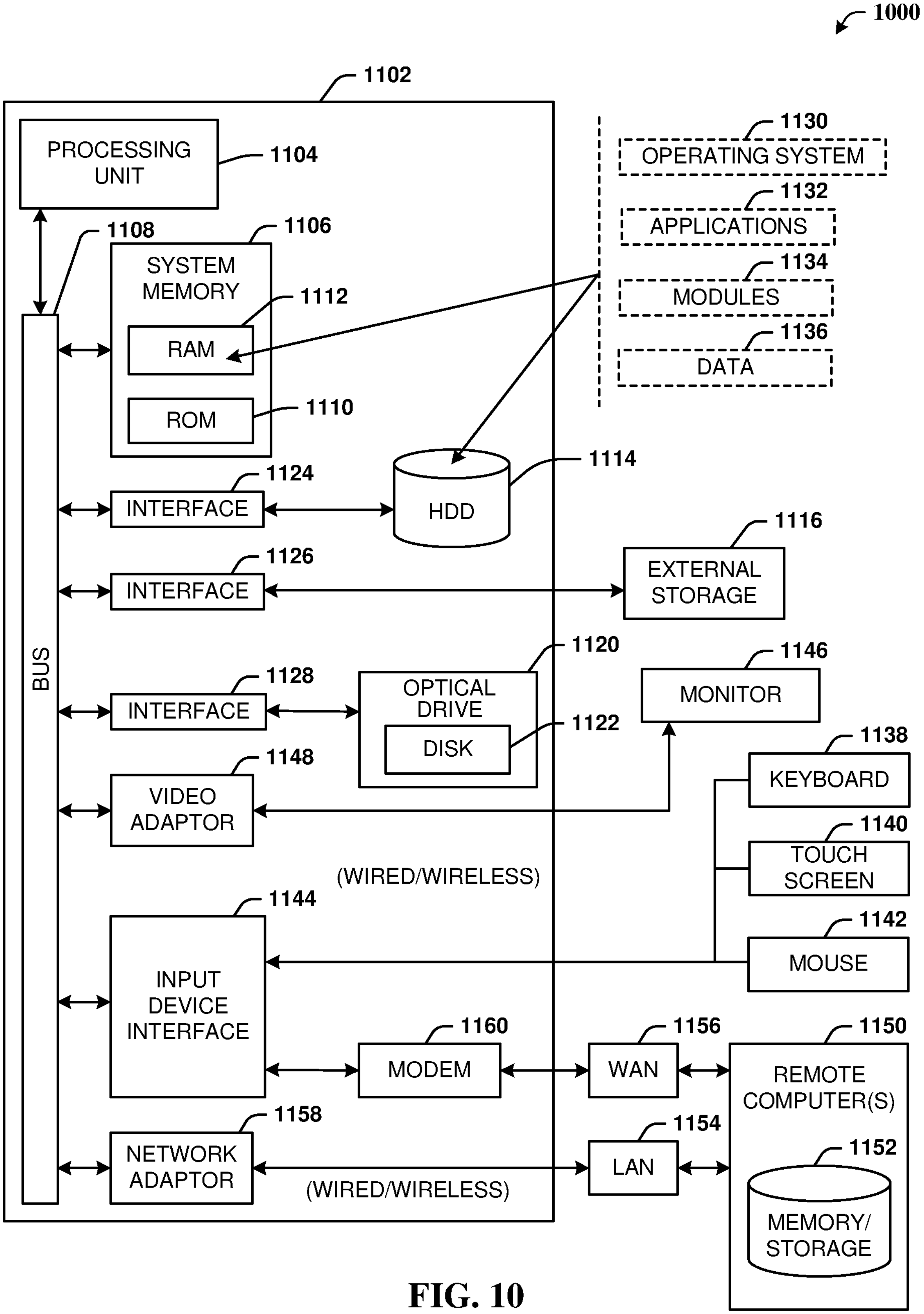
FIG. 10 illustrates an example block diagram of a computer operable to execute certain embodiments of this disclosure.

Referring now to FIG. 10, there is illustrated a block diagram of an exemplary computer system operable to execute the disclosed architecture. In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

What has been described above comprises examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term “article of manufacture” as used herein is intended to encompass a computer program accessible from by a computing device.

As it employed in the subject specification, the term “processor” can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as “store,” “data store,” “data storage,” “database,” “repository,” “queue”, and substantially any other information storage component relevant to operation and functionality of a component, refer to “memory components,” or entities embodied in a “memory” or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a “means”) used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term “modulated data signal” or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like “user equipment,” “user device,” “mobile device,” “mobile,” station,” “access terminal,” “terminal,” “handset,” and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms “access point,” “node B,” “base station,” “evolved Node B,” “cell,” “cell site,” and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

What is claimed is:

1. A device, comprising:

a processor; and a memory that stores executable instructions that, when executed by the processor, facilitate performance of operations, the operations comprising:

determining a plurality of destination results satisfying a query at a navigation application;

determining whether a plurality of safety ratings associated with the plurality of destination results satisfy a threshold associated with a defined safety criterion;

responsive to determining that the plurality of safety ratings associated with the plurality of destination results satisfy the threshold associated with the defined safety criterion, presenting the plurality of destination results via the navigation application;

determining that a child is present according to scheduling information associated with the child;

generating an updated threshold associated with the defined safety criterion responsive to the determining that the child is present;

determining whether the plurality of safety ratings associated with the plurality of destination results satisfy the updated threshold associated with the defined safety criterion; and responsive to determining that a first safety rating of a first destination result of the plurality of destination results does not satisfy the updated threshold associated with the defined safety criterion, presenting the plurality of destination results via the navigation application with an indicium that indicates that the first safety rating of the first destination result does not satisfy the updated threshold.

2. The device of claim 1, wherein the defined safety criterion is a function of a crime rate metric associated with a geographic location.

3. The device of claim 1, wherein the defined safety criterion is a function of a health services metric associated with a geographic location.

4. The device of claim 1, wherein the plurality of destination results further comprises at least one of a location of the first destination result and a path to a location of the first destination result.

5. The device of claim 1, wherein the indicium that indicates that the first safety rating of the first destination result does not satisfy the updated threshold includes a text color, a background color, or any combination thereof.

6. The device of claim 1, wherein the indicium that indicates that the first safety rating of the first destination result does not satisfy the updated threshold includes a warning symbol.

7. The device of claim 1, wherein the operations further comprise updating a value of the defined safety criterion in response to settings input to the device.

8. The device of claim 1, wherein the operations further comprise:

collecting 911 call information; and storing the 911 call information at a safety data store.

9. The device of claim 1, wherein the threshold associated with the defined safety criterion is further updated according to travel history data.

10. The device of claim 1, wherein the operations further comprise, in response to selection input to the device that indicates the defined safety criterion is a priority, updating the plurality of destination results to comprise only destination results that satisfy the defined safety criterion.

11. The device of claim 1, wherein the operations further comprise, in response to selection input to the device that indicates the defined safety criterion is a priority, updating the plurality of destination results to include only paths to the first destination result that satisfy the defined safety criterion.

12. A non-transitory machine-readable medium, comprising executable instructions that, when executed by a processor of a device, facilitate performance of operations, comprising:

determining whether a plurality of safety ratings associated with a plurality of destination results at a navigation application satisfy a threshold associated with a defined safety criterion;

responsive to determining that the plurality of safety ratings associated with the plurality of destination results satisfy the threshold associated with the defined safety criterion, presenting the plurality of destination results via the navigation application;

determining that a child is present according to scheduling information associated with the child;

generating an updated threshold associated with the defined safety criterion responsive to the determining that the child is present;

determining whether the plurality of safety ratings associated with the plurality of destination results satisfy the updated threshold associated with the defined safety criterion; and responsive to determining that a first safety rating of a first destination result of the plurality of destination results does not satisfy the updated threshold associated with the defined safety criterion, presenting the plurality of destination results via the navigation application with an indicium that indicates that the first safety rating of the first destination result does not satisfy the updated threshold.

13. The non-transitory machine-readable medium of claim 12, wherein the operations further comprise:

in response to selection input that selects a first destination result from the plurality of destination results, determining a group of paths to the first destination result.

14. The non-transitory machine-readable medium of claim 13, wherein the group of paths to the first destination result is filtered based on intersection with a location that exceeds the threshold associated with the defined safety criterion.

15. The non-transitory machine-readable medium of claim 12, wherein the threshold is further updated according to travel history data.

16. The non-transitory machine-readable medium of claim 12, wherein the operations further comprise:

collecting 911 call information; and storing the 911 call information at a safety data store.

17. A method, comprising:

determining, by a processing system including a processor, whether a plurality of safety ratings associated with a plurality of destination results at a navigation application satisfy a threshold associated with a defined safety criterion;

responsive to determining that the plurality of safety ratings associated with the plurality of destination results satisfy the threshold associated with the defined safety criterion, presenting, by the processing system, the plurality of destination results via the navigation application;

generating, by the processing system, an updated threshold associated with the defined safety criterion responsive to determining that a child is present;

determining, by the processing system, whether the plurality of safety ratings associated with the plurality of destination results satisfy the updated threshold associated with the defined safety criterion; and responsive to determining that a first safety rating of a first destination result of the plurality of destination results does not satisfy the updated threshold associated with the defined safety criterion, presenting, by the processing system, the plurality of destination results via the navigation application with an indicium that indicates that the first safety rating of the first destination result does not satisfy the updated threshold.

18. The method of claim 17, further comprising receiving, by the processing system, an indication that the defined safety criterion is a priority in determining the plurality of destination results.

19. The method of claim 17, further comprising updating, by the processing system, the plurality of destination results to comprise only the plurality of destination results that are not situated at a location that fails to satisfy the defined safety criterion.

20. The method of claim 17, wherein presenting the indicium comprises presenting, by the processing system, the indicium in response to a determination that a path to the first destination result intersects a location that fails to satisfy the defined safety criterion.

* * * * *